Sept. 9, 1941.  E. B. HAWTHORNE  2,255,357
TRANSPORTATION TRAILER FOR LIVESTOCK
Filed June 23, 1941  2 Sheets-Sheet 2
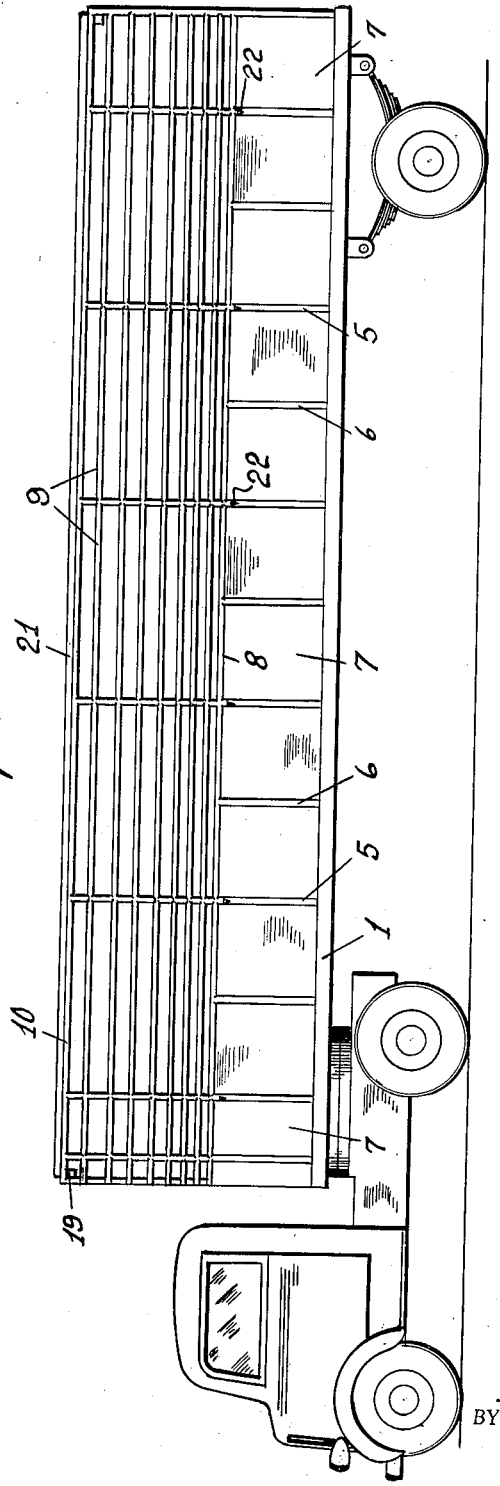
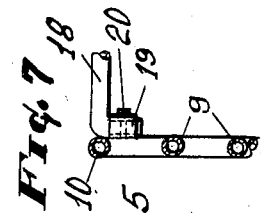
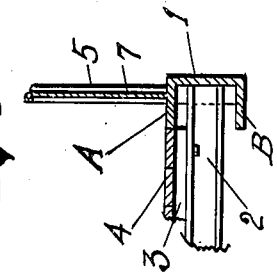
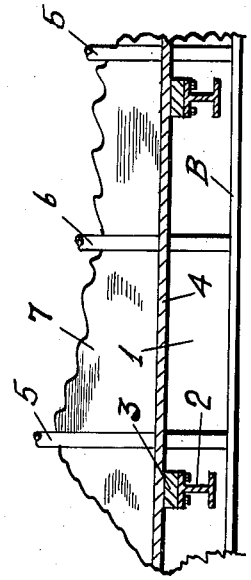
INVENTOR.
EBEN B. HAWTHORNE
BY
ATTORNEY.

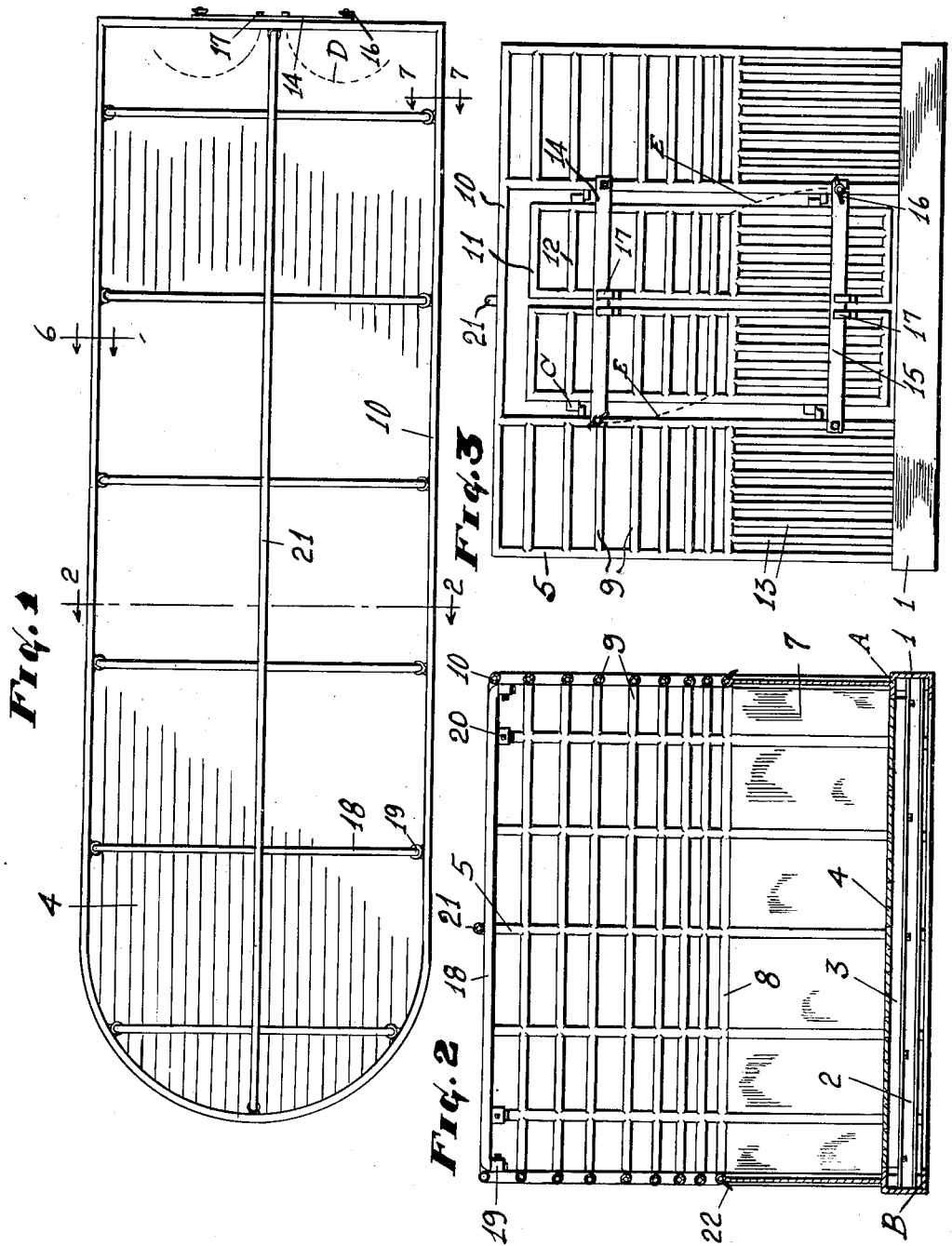

Patented Sept. 9, 1941

2,255,357

UNITED STATES PATENT OFFICE 2,255,357

TRANSPORTATION TRAILER FOR LIVESTOCK

Eben B. Hawthorne, Eureka, Kans.

Application June 23, 1941, Serial No. 399,335

5 Claims. (Cl. 296—28)

This invention relates to improvements in transportation trailers for live stock, and has for its principal object the adoption of hollow tubular elements as a non-resisting feature with respect to a head wind pressure during transit of the trailer as the wind is free to pass between the tubular elements with comparatively small resistance; furthermore, the elimination of abrupt or sharp corners inwardly projecting from the members of the rack of the trailer is a means to avoid severe bruises or cuts on the live stock, thereby causing a depreciation thereof at the time of placing the same on the market.

A further object of this invention is to construct a live stock trailer of such material and method of assembly as to produce a trailer body of great length and durability as a rapid method to transport live stock in large numbers per load.

A still further object of this invention is to unitize the members of the body by welding the intersecting parts of the metal together, the floor to be of wood construction to avoid slipping of the feet of the livestock in the event of a sudden movement of the trailer.

A still further object of this invention is to construct a trailer having an arcuate front end to facilitate short turning of the truck to which the trailer is rockably attached, and the trailer being provided with inward swinging gates at the rear end thereof to load and unload the livestock, and furthermore a solid enclosure adjacent each side of the doors is eliminated and being substituted by pipes vertically disposed and spaced apart to avoid a wind resistance when the trailer is in transit.

These and other objects will hereinafter be more fully explained, reference being had to the accompanying drawings forming a part of this specification, and in which like characters will apply to like parts in the different views.

Referring to the drawings:

Fig. 1 is a plan view of a trailer.

Fig. 2 is an enlarged sectional view taken on line 2—2 in Fig. 1, looking in the direction of the arrows.

Fig. 3 is a rear elevation of the trailer.

Fig. 4 is a side view of the trailer and motor vehicle.

Fig. 5 is a sectional view through a fragmentary portion of the side of the trailer adjacent the floor.

Fig. 6 is a fragmentary sectional view through the trailer body transverse to its length taken on line 6—6 in Fig. 1.

Fig. 7 is a fragmentary sectional view through the upper extremity of the rack transverse to its length taken on line 7—7 in Fig. 1.

The invention herein disclosed relates to a live stock trailer consisting of a frame 1 hereinafter referred to as stringer, and being of channelled structural steel as supporting means for the superstructure of the trailer, said stringer extending across the rear of the trailer and along each side thereof, and being arced to circumscribe the front end of the trailer floor, the joints required for the assembly of stringer being welded together. Transversely crossing the trailer and in spaced relation from the rear to the front is a plurality of I-beams 2, the ends of which are welded to their respective sides of the stringer, said beams being spaced downward from the upper plane of the stringer and each having a nail tie 3 secured to its upper extremity thereof and upon which is secured a series of flooring boards 4 that are matched together and nailed to said ties, the top of the floor being on a plane with the upper extremity of the stringer. The sides and ends of the superstructure consist of a plurality of tubular standards 5 in spaced relation along the sides and ends of the stringer, the upper leg A of the stringer being apertured corresponding with the spaced relation of the standards, and through which said standards are insertible, the lower ends of which seat on the leg B of the said stringer as shown in Figs. 2, 5, and 6, and being welded together where they intersect the said leg portions, there being short standards 6 intermediately positioned to the first said standards except at the rear that are secured to the stringer in like manner.

The superstructure of the trailer consists of a plurality of metal sheets 7, the lower edge of which is welded to the stringer, and of such width terminating with the upper extremity of the intermediate standards and being welded thereto and to their first named standards with which it contacts, also to a horizontally disposed pipe 8 seating on the upper edge of said sheets and upper ends of said intermediate standards, to which it is welded, and likewise its ends to the sides of the first said standards, and so on from standard to standard, and a plurality of like pipes 9 in graduated spaced relation from the said pipe 8 to the upper extremity of the standards, each end of said pipes 9 being welded to the standards respectively, except the upper pipe 10 which rests upon the ends of standards, and being in long lengths and securely welded together and to said standards, said pipes 8, 9, and 10 aligned horizontally with respect to each row thereof as shown in Figs. 2, 3, and 4.

It will be seen that the front end of the trailer is semicircular, while the rear is positioned at right angles to the sides. In Fig. 3 is shown the desired construction of the rear end consisting of a pair of gates, each hingedly connected as at C to its respective standard and adapted to swing inward from each other as shown by dotted lines D in Fig. 1, said gates each having a frame 11 extending therearound, while the upper portion of each has similar horizontally disposed pipes 12 correspondingly positioned and aligned with the first said pipes, the lower portion of the gate and the space at each side thereof having a plurality of vertically disposed pipes 13 spaced apart, the ends of which are welded to the stringer, gate frame and lower pipe of said series respectively.

Rockably secured to the gate standards is a pair of bars 14 and 15 as securing means for the gates against an outward swing. To avoid mutilation of the bars when the gates are opened, it will be seen that bar 14 is rockably connected to one standard, while bar 15 is rockably connected to the other standard, each bar adapted to swing in the direction shown by dotted lines O—E, and secured to its respective standard by a bolt passing through the bar and having a wing nut 16 threadedly engaging thereon to bind the bar, while the gates may be opened lying on their respective sides of the end of the rack.

It will also be understood that the abutting sides of the gate each have loops 17 in which the bars will seat respectively as securing means against an inward swing of the gates when said gates are closed.

Transversely crossing the trailer at its upper extremity is a plurality of pipes 18 to function as ties, each engaging with its respective standard, and being secured thereto by a nipple 19 that is welded to the standard, each end of each tie having a right angle bend to engage in the nipple and being secured thereto by a bolt 20 threadedly engaging in the wall of the nipple and through an aperture in the right angle bent portion as shown by dotted lines in Fig. 7, and the side tie pipes being secured by a pipe 21 transversely crossing the same and centrally disposed as shown in Fig. 1, and being preferably welded at each intersection whereby the tie rods may be removed and replaced simultaneously; being so assembled and positioned is means to support a canvas or the like, the latter extending downward over each side to engage with hooks 22 to weather proof the trailer with respect to its top and open portion of the sides and ends, said canvas not being shown in the drawings.

And modifications may be made as lie within the scope of the appended claims.

Having fully described my invention what I claim as new and desire to secure by Letters Patent is:

1. In a trailer of the class described comprising a channelled steel stringer formed to provide two sides and two ends as supporting means for the trailer's superstructure, a floor and means carried by the stringer to support the floor so that the top of the floor is on the plane with the upper extremity of the stringer, a plurality of vertically disposed standards spaced along the stringer its entire length, the lower ends of the standards being welded to the stringer, a series of pipes horizontally disposed to engage between the standards, the ends of each pipe being in contact with their respective standards and welded thereto, the series of pipes in their spaced relation starting at the upper extremity of the standards but terminating a spaced distance upward from the stringer, a metallic sheet to fill the space between the standards and extending from the stringer to the lower pipe of the said pipe series, the metallic sheet being welded at its points of contact with the standards, stringer and the said lower pipe, and pipe means to brace the oppositely disposed standards as carried by the stringer, there being a pair of gates hingedly connected to their respective standards at the rear end of the trailer's superstructure, and having means to lock the gates in closed position, the space between each side of the pair of gates and their respective standards having a similar series of positioned pipes to that of the first named series, while the space from the stringer upward to the lower pipe of the series having a plurality of vertically disposed pipes positioned in spaced relation between the gate standards and their respective standards at the rear corners of the superstructure.

2. In a unitized livestock trailer, the trailer comprised of a floor, side and end walls for the superstructure of the trailer and wheels to carry one end of the trailer and pivot means to connect the trailer to a motor-driven vehicle, the floor being carried by a stringer at the base of the superstructure surrounding the floor, a plurality of tubular standards vertically disposed and positioned in spaced relation along the stringer, seating thereon and being welded thereto, a metallic sheet for each space between the standards, the sheet vertically disposed and being welded at its lower extremity to the stringer while the ends are welded to their respective standard, a plurality of pipes horizontally disposed and positioned in the space between the standards, said pipes spaced apart vertically from the upper edge of the sheet to the upper extremity of the standards, the ends of said pipes being welded to their respective standards while the lower pipe is welded to the said upper edge of the metallic sheet, a plurality of pipes transversely crossing the trailer from side to side, the ends of the pipes being secured to the upper ends of the standards to tie the sides together, and a single pipe extending from end to end of the trailer and lying on the said transversely positioned pipes at the center thereof and being welded where the single and transversely positioned pipes intersect, one end of the trailer having gates hingedly connected for loading and unloading purpose, said gates being secured in their closed position by a pair of bars horizontally crossing the gates, and means to secure the ends of each bar to their respective standards at the said end of the trailer, and means to secure the gates to each bar substantially as shown.

3. In a livestock trailer having a floor, side and end walls, said side and end walls comprised of hollow standards vertically disposed and pipes horizontally disposed and extending from standard to standard, said pipes plurally assembled and spaced apart vertically from the top of the standards to a spaced distance from the bottom of the standards, one end wall being semi-circular by bending the horizontally disposed pipes, the other end transversely connecting the sides and being straight, last said end having an opening centrally disposed, the opening having a pair of gates, each being hingedly connected to its respective side of the opening, and means to lock the gates in a closed position and against swinging movement, a solid metallic sheet to close the space between the horizontal pipe and upper plane of the floor and running from standard to standard except for the rear wall wherein said space below the horizontal pipes is provided with vertically disposed pipes spaced apart, all of said pipes, standards, and metallic sheets being welded together at their several points of intersection, a metallic stringer, channel in form, the legs of the channel extending inward whereby said standards, lower edge of said metallic sheets and the lower ends of the vertically disposed pipes are welded to the upper extremity of the channel stringer, and a plurality of beams transversely extending from side wall to side wall, in spaced relation and being welded to the stringer as carrying means for the floor and means to secure the floor to the beam in such a way that the top surface of the floor is on a horizontal plane with the top of the stringer, and wheels to carry the end of the trailer body adjacent its gates and means to pivotedly connect the semi-circular end to the rear of a motor-driven vehicle as conveying means for the trailer.

4. In a trailer as recited in claim 3, the upper leg of the channel being bored to receive each standard extending through the aperture and seating on the lower leg of the channel and being welded thereto and where they engage in the aperture.

5. In a trailer as recited in claim 3, a hollow nipple welded to each standard adjacent the upper ends thereof and being inwardly positioned with respect to the walls, a pipe having a right angle bend for a portion of each end thereof, said portions insertible in their respective nipple and being secured by a threadedly engaging set screw, and a centrally disposed pipe transversely crossing the last said pipes and being welded thereto to unitize as a supporting means for a canvas to enclose the top of the trailer.

EBEN B. HAWTHORNE.